United States Patent [19]

Schmidt

[11] 4,084,539

[45] Apr. 18, 1978

[54] VOLTAGE TO AIR PRESSURE TRANSDUCER

[75] Inventor: Robert W. Schmidt, Oak Lawn, Ill.

[73] Assignee: Copar Corporation, Oak Lawn, Ill.

[21] Appl. No.: 726,451

[22] Filed: Sep. 24, 1976

[51] Int. Cl.² ............................................. B05C 11/00
[52] U.S. Cl. ..................................................... 118/8
[58] Field of Search .............. 118/2, 7, 8, 11, DIG. 3; 251/131

[56] References Cited

U.S. PATENT DOCUMENTS

| | | | |
|---|---|---|---|
| 3,190,261 | 6/1965 | Ziffer | 118/8 |
| 3,307,824 | 3/1967 | Weisheit | 251/131 |
| 3,348,519 | 10/1967 | Dyess et al. | 118/2 |
| 3,520,276 | 7/1970 | Martin | 118/8 |
| 3,752,189 | 8/1973 | Marr et al. | 251/131 |
| 3,908,583 | 9/1975 | Eberle | 118/8 X |
| 3,931,787 | 1/1976 | Kuttner et al. | 118/8 |

Primary Examiner—Ronald Feldbaum
Attorney, Agent, or Firm—Kinzer, Plyer, Dorn & McEachran

[57] ABSTRACT

A means for providing a variable fluid pressure responsive to changes in a measured variable includes a fluid pressure reservoir and electrically controlled fluid supply and exhaust valves connected thereto. A pressure-to-voltage transducer is connected at the output of the reservoir and in turn is connected to a comparison means along with means for providing an electrical signal representative of a measured variable. The comparison means provides a difference signal, which difference signal is utilized to control the supply and exhaust valves.

3 Claims, 2 Drawing Figures

U.S. Patent
April 18, 1978
4,084,539
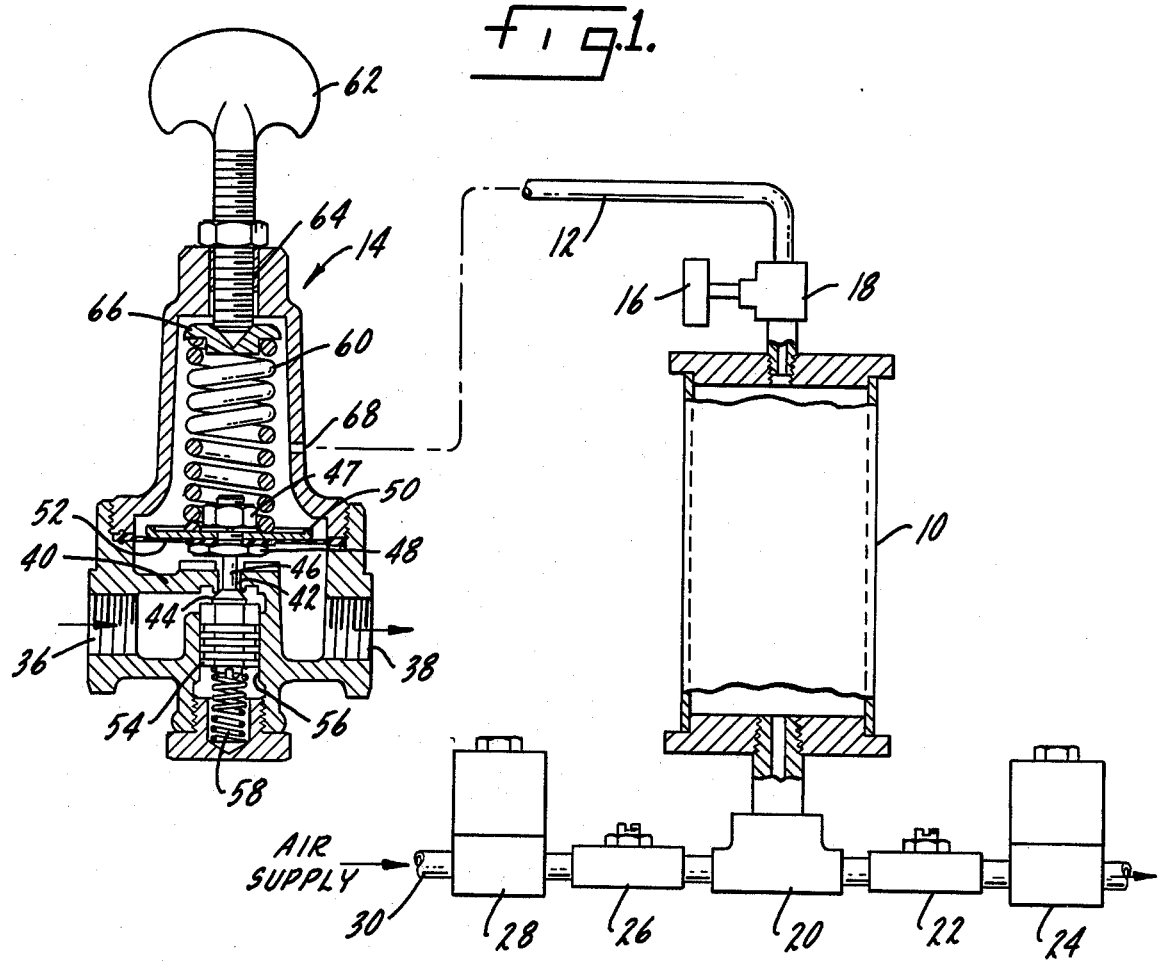
fig.1.
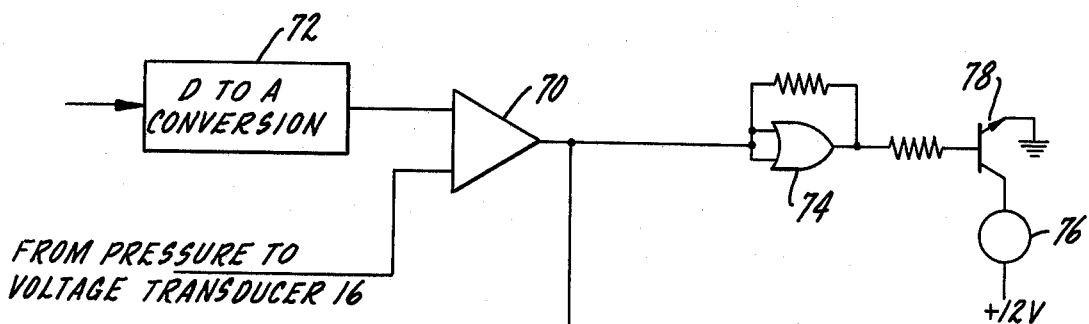
fig.2.
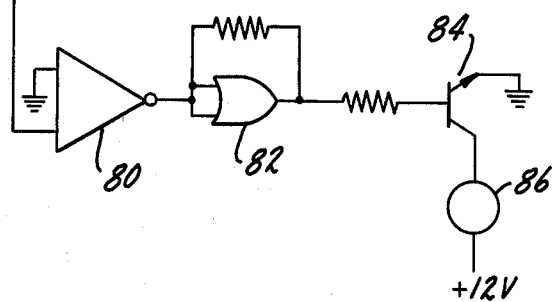

VOLTAGE TO AIR PRESSURE TRANSDUCER

SUMMARY OF THE INVENTION

The present invention relates to a means for providing a variable fluid pressure in response to changes in a measured variable; for example, a variable supply of liquid adhesive in response to variations in speed of the article to which the adhesive is to be supplied.

A primary purpose of the invention is a simply constructed reliably operable system of the type described.

Another purpose is a system of the type described utilizing a pressure-to-voltage transducer which, in cooperation with means for providing an electrical signal representative of a measured variable, controls the pressure within a fluid reservoir.

Another purpose is a variable fluid pressure responsive device which may be used to control the supply of a liquid adhesive.

Another purpose is a system of the type described utilizing electrically controlled fluid supply and exhaust valves.

Other purposes will appear in the ensuing specification, drawings and claims.

BRIEF DESCRIPTION OF THE DRAWINGS

The invention is illustrated diagrammatically in the following drawings wherein:

FIG. 1 is a schematic illustration of a pressure-responsive system of the type described, and FIG. 2 is an electrical diagram showing the system for controlling fluid pressure in the reservoir of FIG. 1.

DESCRIPTION OF THE PREFERRED EMBODIMENT

The present invention relates to a system for providing a variable fluid pressure in response to changes in a measured variable. The system has particular application in an apparatus for applying glue or a liquid adhesive to a moving corrugated box blank. However, the described control has wider utility. For example, it may be used in a system for controlling the tension on a roll of paper, in which case this invention would be used to provide an air pressure and a brake tension in proportion to the roll diameter, or some other type of material web. The invention will be described particularly as utilized in a means for dispensing liquid adhesive.

The type of fluid pressure which may be utilized in the controls described herein may vary. Air pressure is highly satisfactory, particularly when utilized in connection with a liquid adhesive. In other applications, the variable controlled air pressure would be applied to the bonnet of a regulator of the type shown, in which case it could be used to control the pressure of steam, water or air, as this invention is primarily meant to produce a static pressure proportional to a voltage produced by another variable and is not meant primarily as a means in itself of producing a large volume of another fluid under a controlled pressure.

In FIG. 1 an air reservoir is indicated at 10 and is connected through an output conduit 12 to a pressure regulating valve 14. A pressure-to-voltage transducer 16 is connected to a fitting 18 in conduit 12, with the transducer 16 providing an output voltage directly proportional to the fluid pressure in line 12. Such transducers are common in the art and one such transducer is manufactured by National Semiconductor and is identified as number LX 1720 G.

The input for reservoir 10 is provided by a T fitting 20 which has one arm connected to a bleed valve 22 and then to a solenoid valve 24 having an exhaust opening. The other arm of T 20 is connected through a bleed valve 26 to a solenoid 28 having an input connected to an air supply indicated diagrammatically at 30. Thus, solenoid valves 28 and 24 control the supply of air pressure to reservoir 10 and the exhaust of air pressure from the reservoir in accordance with operation of the electrical coils within the valves. Bleed valves 22 and 26 control the rate at which pressure is increased or decreased within the reservoir.

Pressure regulating valve 14 has an input port 36 and an output port 38. Port 36 will conventionally be connected to a pressurized supply of liquid adhesive and output port 38 will be connected to a conventional device for applying liquid adhesive to moving corrugated box blanks. Valve 14 includes an internal wall 40 having a passage 42 which is controlled by movement of a valve member 44. Valve member 44 is mounted upon a stem 46, the upper end of which is fastened through nuts 47 and 48, and a plate 50 to a diaphragm 52, the outer periphery of which is secured to the housing of valve 14. Beneath valve member 44 and on stem 46 is a pilot member 54 reciprocal within a bore 56 formed in the valve housing. A small spring 58 is positioned beneath the pilot to normally urge the valve member in an upward direction.

A large coil spring 60 is seated upon plate 50 and thus upon diaphragm 52. A manually operable screw 62 is threaded, as at 64, into the upper end of the housing of valve 14 and has a member 66 at its lower end which seats upon the upper coil of spring 60. Thus, the degree of force applied by spring 60 to diaphragm 52 can be controlled by turning screw 62.

A port 68 is formed in the wall of pressure regulator valve 14 and is connected to conduit 12. Thus, the fluid pressure supplied from reservoir 10 through conduit 12 acts in parallel with spring 60 upon diaphragm 52 to control communication through passage 42. The pressure of liquid adhesive passed from inlet port 36 to outlet port 38 is determined by the force applied by spring 60 and the air pressure supplied at port 68. In most cases, manually operated screw 62 will be backed off completely so that the pressure produced by the valve will be approximately equal to the air pressure supplied to the top of the diaphragm. The valve shown is a standard pressure reducing valve and except for minor details of construction is of a type commonly supplied by numerous manufacturers.

In FIG. 2, a differential amplifier is indicated at 70 and has one input from a digital to analog converter 72 and a second input from pressure-to-voltage transducer 16. Digital to analog converter 72 will provide a direct analog electrical signal which is a function of the speed at which a carton blank is moving, for example, as it leaves the slotter cylinder of a printer-slotter in a conventional paperboard box manufacturing line. Differential amplifier 70 has its output connected to a Schmitt trigger 74, whose output in turn is connected to coil 76, through a transistor 78. Coil 76 is effective to operate solenoid valve 28 in FIG. 1.

The output from differential amplifier 70 is also connected to an inverting amplifier 80 whose output is connected to a Schmitt trigger 82 and then through a transistor 84 to coil 86 of solenoid valve 24.

Since it is necessary to control the application of liquid adhesive in accordance with the speed of the moving carton blank in order to insure that the appropriate amount of adhesive is always applied to the blank, there must be correlation between the volume of the adhesive and the speed of the blank. The amount of adhesive of the pressure of the adhesive to the dispenser is controlled by pressure regulating valve 14. Valve 44 will open as necessary until the pressure in port 38 causes an upward force on diaphragm 52 great enough to overcome the force of spirng 60 and the air pressure from pipe 12. In some applications the spring may be eliminated and the entire control of adhesive may be directed solely by the application of fluid pressure to the pressure regulating valve.

The provision of air pressure at port 68 is controlled by pressure-to-voltage transducer 16 and the circuit described above. Assume that the pressure within reservoir 10, which controls the pressure at port 68, provides an output voltage from transducer 16 that is lower than the voltage from digital to analog converter 72. This would indicate that there is not sufficient adhesive pressure to correspond to the speed of the moving carton. Amplifier 70 will have a positive output voltage which, through Schmitt trigger 74 and transistor 78, will energize solenoid coil 76 causing an increase in the air supply through T20 and into reservoir 10. The air supply will be increased until the voltage from transducer 16 equals the voltage from digital to analog converter 72, indicating that the appropriate adhesive pressure is being applied in accordance with the speed of the moving cartons.

When the reverse is true, indicating that too much adhesive is being applied for the speed of the carton, the output from differential amplifier 70 is negative, which output is reversed in polarity by inverting amplifier 80. The output from amplifier 80, through Schmitt trigger 82 and transistor 84, causes the operation of coil 86 of solenoid valve 24. This will cause valve 24 to bleed pressure from reservoir 10 to atmosphere, thus reducing the pressure in the reservoir and in turn reducing the amount of liquid adhesive that is supplied by valve 14. The greater the pressure supplied through port 68 to pressure regulating valve 14, the greater will be the amount of liquid adhesive that is supplied through the valve.

In its basic sense the present invention provides a means for translating an electrical signal representative of a variable, i.e., movement of a carton, into an air pressure which is used to control the supply of liquid adhesive for the carton. As indicated above, the described control system has other utility.

Whereas the preferred form of the invention has been shown and described herein, it should be realized that there may be many modifications, substitutions and alterations thereto.

The embodiments of the invention in which an exclusive property or privilege is claimed are defined as follows:

1. A means for controlling the pressure of liquid adhesive in response to movement of the article to which the adhesive is to be applied, including a pressure regulating valve, the input of which is connected to a source of liquid adhesive, the output of which is connected to a means for applying adhesive, said pressure regulating valve including a passage between said input and output and a valve member controlling adhesive flow through said passage, means for providing a variable air pressure upon said valve member, which air pressure varies in response to changes in movement of the article to which adhesive is to be applied, said means for providing a variable air pressure including an air pressure reservoir, a pressure-to-voltage transducer connected at the output of said reservoir, and electrically controlled air pressure supply valve and an electrically controlled exhaust valve connected to said reservoir, means for providing an electrical signal representative of movement of the article to which adhesive is to be applied, comparison means for poviding a signal representing the difference between said electrical signal and the output from said transducer, and means connecting and utilizing said difference signal to control said supply valve and exhaust valve.

2. The structure of claim 1 further characterized in that said comparison means includes a differential amplifier.

3. The structure of claim 2 further characterized in that said electrically controlled supply valve and electrically controlled exhaust valve each include solenoids connected to said differential amplifier.

* * * * *